United States Patent [19]
Uribe et al.

[11] Patent Number: 5,213,271
[45] Date of Patent: May 25, 1993

[54] POWDER SPRAYER WITH PNEUMATIC POWDER SUPPLY SYSTEM

[75] Inventors: Diego Uribe, Barrington; Rolf Hantscho, Lake Zurich; Frank Kowalski, Des Plaines, all of Ill.

[73] Assignee: Oxy-Dry Corporation, Itasca, Ill.

[21] Appl. No.: 743,111

[22] Filed: Aug. 9, 1991

[51] Int. Cl.⁵ ............................................. B05B 5/16
[52] U.S. Cl. .................... 239/654; 239/124; 406/68; 406/106; 406/142; 406/146
[58] Field of Search ............. 239/654, 124, 651; 406/63, 68, 106, 142, 143, 146, 144, 99

[56] References Cited

U.S. PATENT DOCUMENTS

| | | |
|---|---|---|
| 628,187 | 7/1889 | Sibley . |
| 1,444,069 | 2/1923 | Gyger . |
| 1,458,523 | 6/1923 | Coutant . |
| 1,487,485 | 3/1924 | Snow . |
| 2,244,050 | 6/1941 | Cassiere ........................ 406/68 |
| 2,895,768 | 7/1959 | Bray, Jr. . |
| 2,932,548 | 4/1960 | Nav et al. . |
| 3,175,515 | 3/1965 | Cheely . |
| 3,602,394 | 8/1971 | McCune ........................ 239/683 |
| 3,870,233 | 3/1975 | Wilhelm et al. . |
| 3,933,394 | 1/1976 | Klein et al. ................... 406/142 |
| 4,391,860 | 7/1983 | Rotolico et al. . |
| 4,411,388 | 10/1983 | Muck . |
| 4,666,069 | 5/1987 | Morine et al. . |
| 4,692,017 | 9/1987 | Maczuszenko et al. . |
| 4,695,205 | 9/1987 | Levine . |
| 4,780,028 | 10/1988 | McLemore ..................... 406/68 |
| 4,787,783 | 11/1988 | Girardelli . |
| 4,809,602 | 3/1989 | Wheeler ........................ 406/193 |
| 4,812,086 | 3/1989 | Kopernicky . |
| 5,083,710 | 1/1992 | McLoughlin et al. .......... 239/690 |
| 5,088,860 | 2/1992 | Stockdale et al. ............. 406/153 |

FOREIGN PATENT DOCUMENTS

| | | |
|---|---|---|
| 3842811 | 6/1990 | Fed. Rep. of Germany ........ 406/68 |
| 1361086 | 12/1987 | U.S.S.R. ............................. 406/146 |
| 989407 | 4/1965 | United Kingdom ................ 406/146 |

Primary Examiner—Andres Kashnikow
Assistant Examiner—Christopher G. Trainor
Attorney, Agent, or Firm—Leydig, Voit & Mayer

[57] ABSTRACT

A powder sprayer having a housing for containing a quantity of powder, a rotatable roller for metering the discharge of powder from the housing, a powder supply hopper remote from the housing, first and second conduits connecting the powder supply and housing, and a selectively operable regenerative type blower disposed in one of the conduits. The first and second conduits, blower, housing, and supply hopper define a closed loop through which air and powder may be circulated with relatively low-pressure, high air-flow operation for reliably transferring powder from the supply hopper to the housing without the tendency for clogging. In one embodiment, the supply hopper has an associated mixing chamber within which powder is pneumatically agitated for creating a relatively rich, substantially constant air-powder mixture for direction to the sprayer housing. In another embodiment, a dispensing cylinder is employed for directing controlled quantities of powder from the supply hopper into one of the conduits of the closed loop for mixing with the air flow and direction to the sprayer housing.

12 Claims, 3 Drawing Sheets

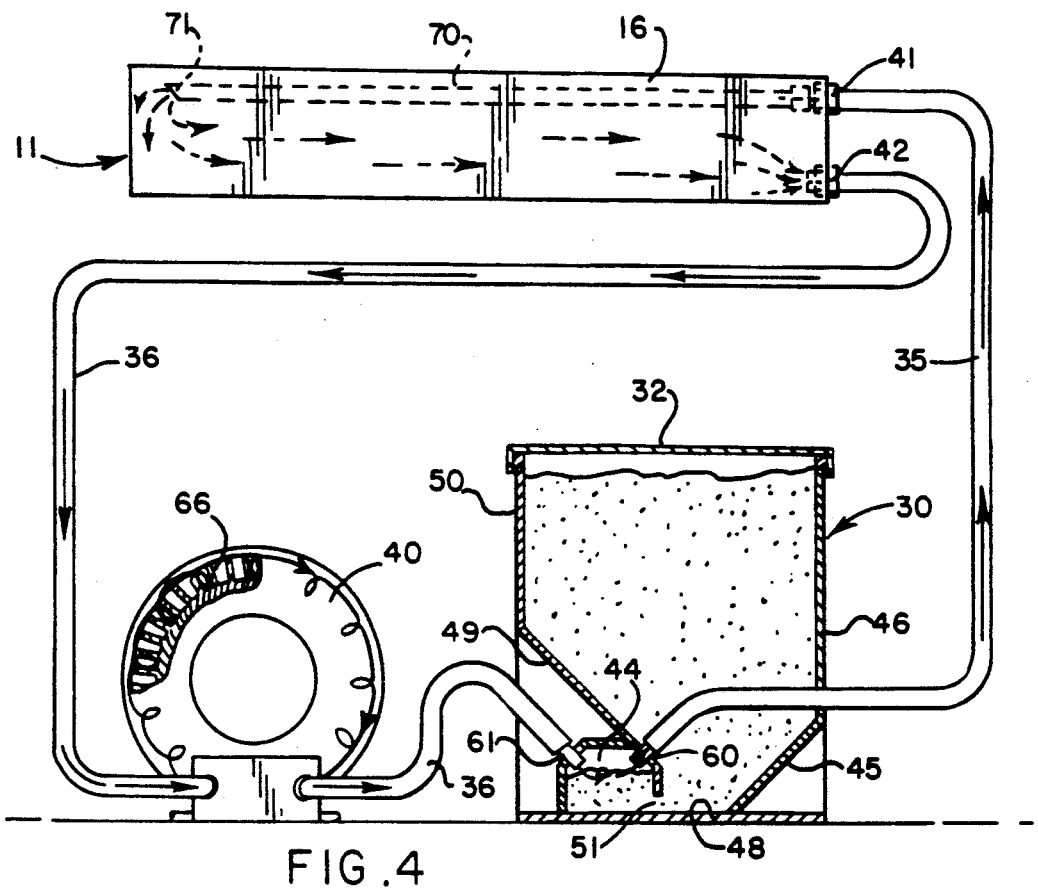
FIG. 4
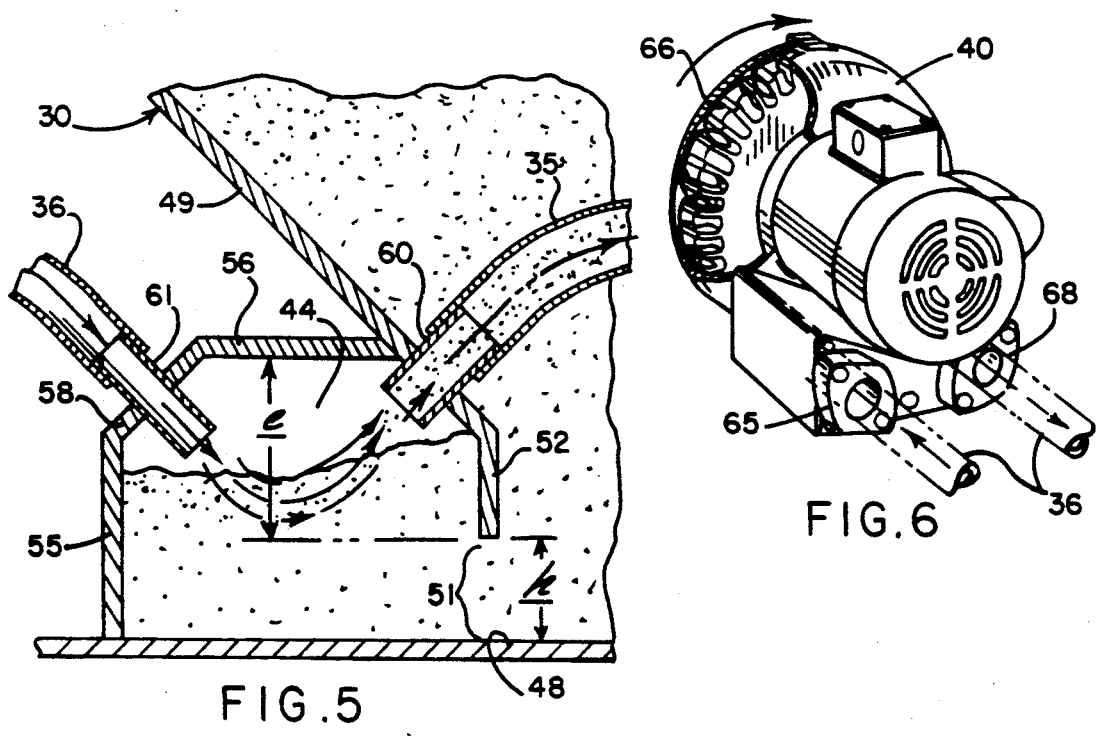
FIG. 5
FIG. 6

POWDER SPRAYER WITH PNEUMATIC POWDER SUPPLY SYSTEM

FIELD OF THE INVENTION

The present invention relates generally to powder sprayers which have particular utility in printing presses, and more particularly, to an automatic powder supply system for such sprayers.

BACKGROUND OF THE INVENTION

Roller type powder sprayers are commonly employed in printing operations for directing powder onto printed sheets prior to delivery to a stacking station in order to maintain sheet separation and prevent offset. Such roller type sprayers typically comprise a box-like, powder-containing housing having an elongated discharge opening in the bottom thereof within which a roller having a relieved outer surface is rotatably disposed. As the roller is rotated, doctor blades which define the discharge opening permit only a metered quantity of powder, as contained within the relieved areas of the roller, to be carried to a discharge zone outside the housing. Electrostatic means may be employed to facilitate complete removal of powder from the roller at the discharge zone.

Heretofore, problems have been incurred in maintaining a supply of powder to the sprayer housing. Conventionally, mechanically operated chains have been employed for conveying powder from a powder supply hopper to the sprayer housing. Such chains typically are directed through tubular members connecting the supply hopper and sprayer housing in order to guard against the discharge of the powder into the atmosphere. A drawback of such chain-type conveyers has been that they usually require the storage hopper to be located with the discharge end thereof substantially level with the sprayer housing. This necessitates the inlet of the supply hopper being located at such a high elevation as to make it cumbersome to refill. Moreover, powder tends to accumulate on the chain, and after prolonged use, can create clogged conditions within the tubular members communicating between the supply hopper and the sprayer housing so as to impede operation of the sprayer. Further operational problems occur if the sprayer housing overfills, including the undesirable discharge of powder into the environment around the sprayer.

In an effort to overcome such problems, proposals have been made for the pneumatic transfer of powder from the supply hopper to the sprayer housing, such as shown in application Ser. No. 07/241,040 assigned to the same assignee as the present application. Such system, however, requires filters for air exiting the system, which necessitates periodic filter replacement and/or cleaning and, if not properly effected, can permit escape of powder to the outside environment. The quantity of powder transferred between the hopper and the applicator roll in such pneumatic system also has been found to vary depending upon the level of powder in the hopper, and when low levels are present, considerable time can be required to fill the applicator roller housing. The pneumatic supply and return conduits connected between the supply hopper and applicator roll also still are susceptible to clogging, which can hinder efficient operation of the system. The system further requires timers and interlocks for controlling the fill cycle for the applicator roller, which are costly in design and subject to selected operational settings.

OBJECTS AND SUMMARY OF THE INVENTION

It is an object of the present invention to provide an improved, more reliable pneumatic system for transferring powder to powder sprayers in printing operations.

Another object is to provide a pneumatic powder supply system as characterized above which eliminates the need for the exhaust of air to the outside environment, and hence, the need for filtering of exhausted air and the costs associated with filter maintenance and replacement.

A further object is to provide a continuously operable pneumatic supply system of the foregoing type that is not dependent upon timers and interlocks for controlling the fill cycle.

Still another object is to provide a pneumatic powder supply system of the above kind in which a relatively rich mixture of powder and air is continuously directed from a supply hopper to the applicator roll housing so long as powder is maintained above a predetermined minimal level in the supply hopper.

Yet a further object is to provide a pneumatic powder supply system that is less susceptible to clogging of powder in supply and return conduits connecting the supply hopper and applicator roller housing. A related object is to provide a pneumatic powder supply system in which the supply and return conduits are part of a closed loop transfer system within which a relatively low pressure, high volume air flow is maintained for creating a recirculating turbulence that prevents build-up of powder within the conduits.

Another object is to provide a pneumatic powder supply system of such type which is relatively simple in design and which lends itself to economical manufacture and more reliable operation.

Other objects and advantages of the invention will become apparent upon reading the following detailed description and upon reference to the drawings, in which:

BRIEF DESCRIPTION OF THE DRAWINGS

FIG. 4 is a partially diagrammatic depiction of the operation of the illustrated sprayer and powder supply system;

FIG. 5 is an enlarged vertical section of a portion of the powder supply hopper showing the connections for the support and return conduits to the sprayer;

FIG. 6 is a perspective of the regenerative pump utilized in the illustrate powder supply system;

Figure 1:
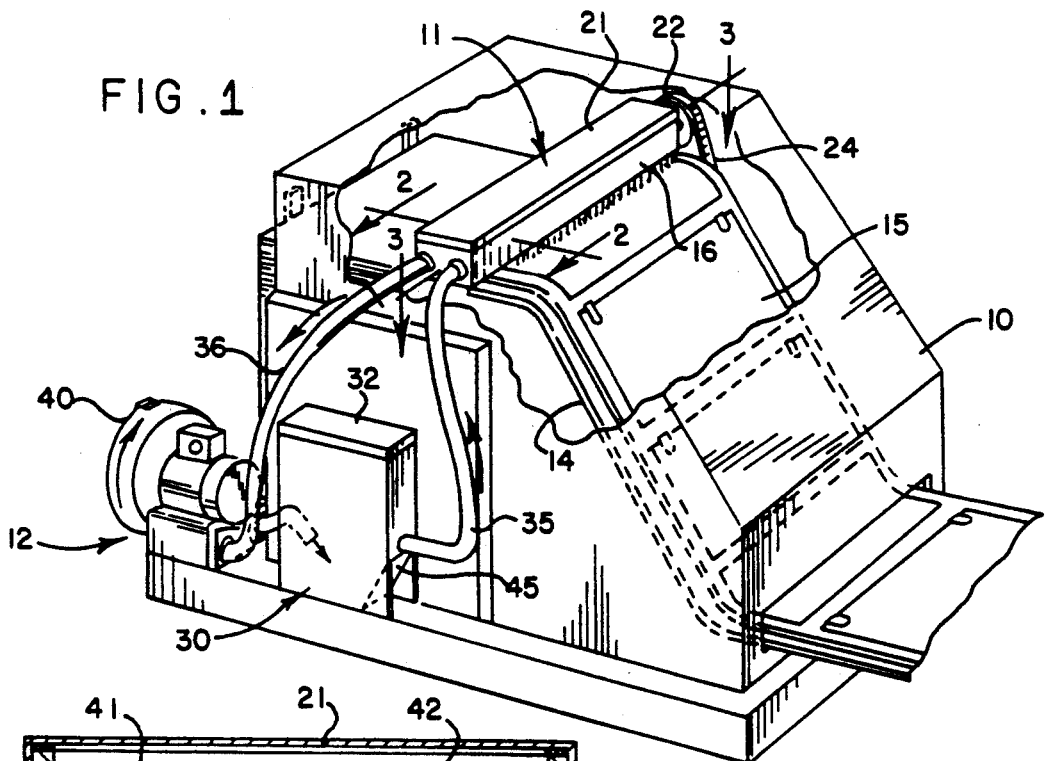
FIG. 1 is a perspective of the delivery end of a printing press having a powder sprayer with a powder supply system in accordance with the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DESCRIPTION OF THE PREFERRED EMBODIMENTS

Referring now more particularly to FIG. 1 of the drawings, there is shown the delivery end of a printing press 10 having a powder sprayer 11 with a powder supply system 12 in accordance with the present invention. The printing press 10 may be of a conventional type, in this case having a sheet delivery system which comprises a chain conveyer 14 with a plurality of sheet grippers for successively transferring printed sheets 15 below the sprayer 11 where powder is directed onto the sheets so as to maintain spacing and prevent offset when stacked at a delivery station.

Figure 2:
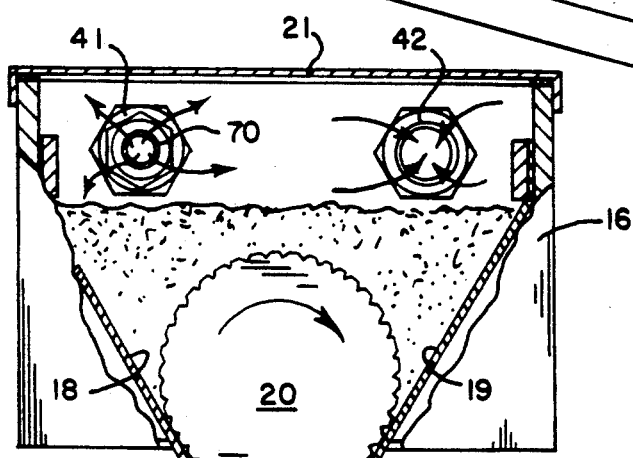
FIG. 2 is an enlarged vertical section of the sprayer, taken in the plane of line 2—2 in FIG. 1.
Figure 3:
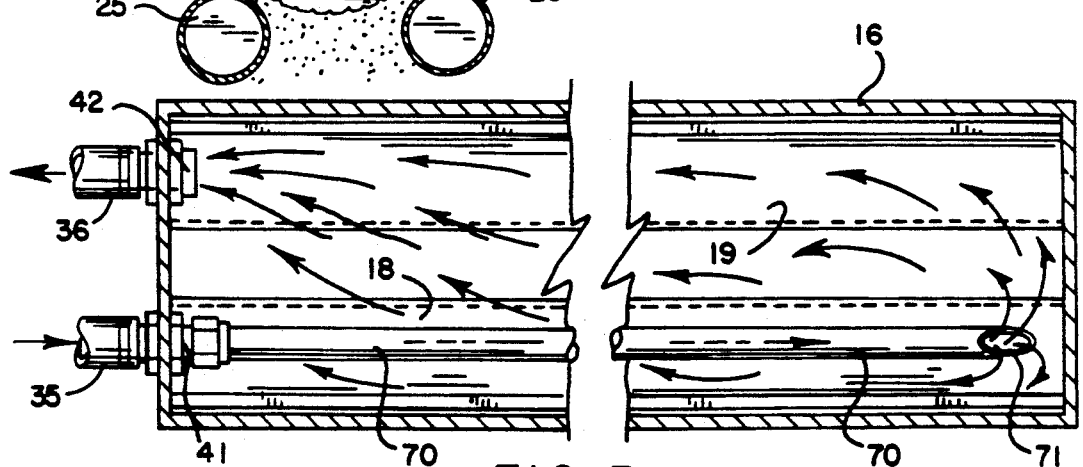
FIG. 3 is an enlarged horizontal section of the sprayer, taken in the plane of line 3—3 in FIG. 1.
Figure 7:
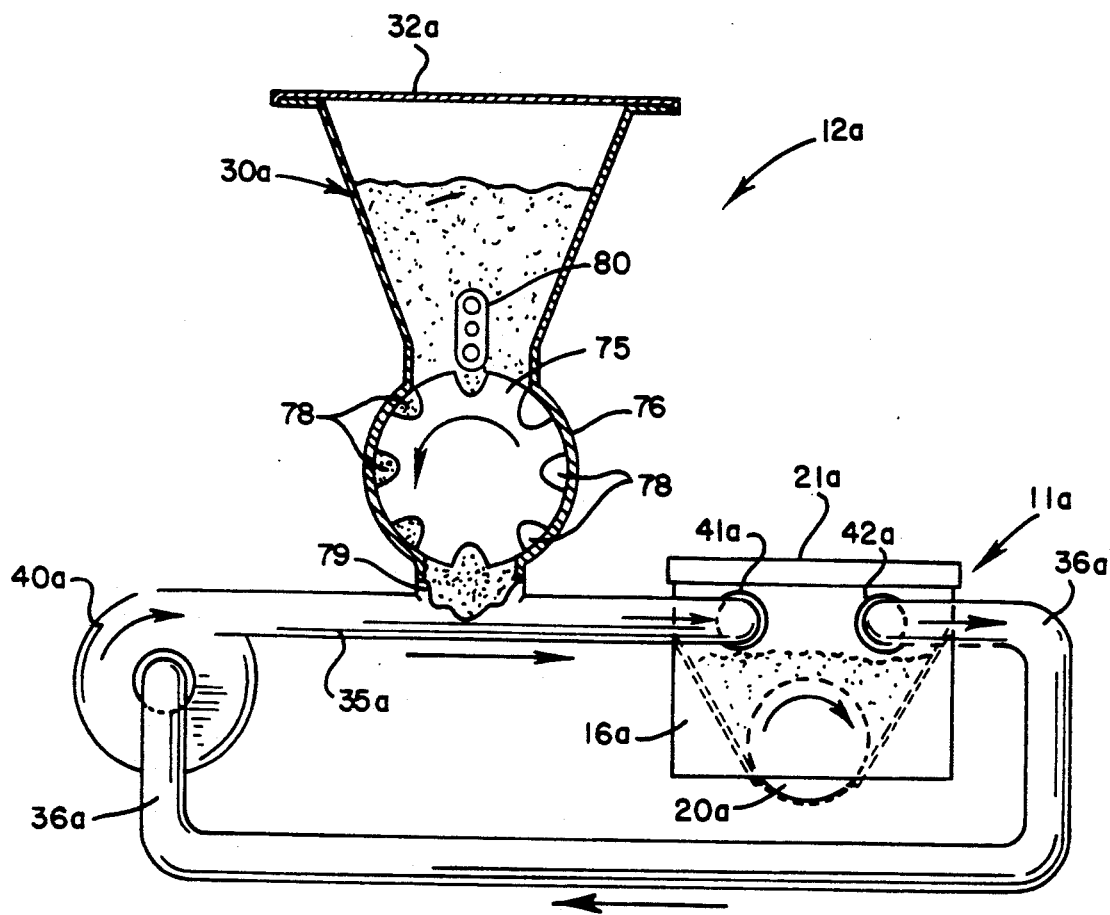
FIG. 7 is a partially diagrammatic depiction of an alternative embodiment of a sprayer and powder supply system according to the invention.

The illustrated sprayer 11 has an elongated, powder-containing box-like housing 16 which has a trough shaped bottom formed by doctor blades 18, 19 that define an elongated bottom discharge opening within which a metering roller 20 is rotatably mounted (FIG. 2). The sprayer housing 16 has a removable cover 21 to permit access to the interior of the housing for inspecting the quantity of powder contained therein. For driving the metering roller, the metering roller 20 has an output shaft extending from one end thereof which carries a sprocket 22 that in turn is coupled to a chain 24 which may be driven by an appropriate electric motor, or alternatively connected to the drive of the printing press so as to be operated simultaneously with the press. The metering roller 20 may be of a known type having an outer periphery formed with relieved areas.

As is known in the art, upon rotation of the metering roller 20, the doctor blades 18, 19 disposed in closely adjacent relation to the outer periphery of the roller 20 permit only a metered quantity of powder, as contained within the relieved areas of the roller, to be carried through the discharge opening. To effect removal of the powder from the surface of roller 20 after proceeding through the discharge opening, electrostatic means is provided, which in this case includes a pair of tubular electrodes 25, 26 mounted in closely adjacent relation below opposite sides of the elongated discharge opening. The electrodes 25, 26 may be charged to relatively high voltages, such as on the order of 10,000 volts, so as to create a corona zone about the underside of the metering roller 20 which has the affect of blasting the powder from the relieved areas of the outer peripheral surface of the metering roller and preventing build up of powder on the housing about the discharge opening.

For providing a supply of powder to the sprayer housing 16, the powder supply system 12 includes a hopper 30 which may be located remotely from the sprayer housing 16, in this case being mounted adjacent one side thereof. The hopper 30, which preferably is sized to hold from twelve to sixty pounds of powder, has a removable or pivotable lid 32 that may be opened to permit refilling of the hopper. The lid 32 preferably has an appropriate sealing gasket about its periphery so as to prevent the escape of powder from the hopper during operation of the sprayer.

In accordance with the invention, the powder supply system includes closed loop pneumatic powder transfer means which includes a blower adapted for circulating air through the closed loop and directing an air-powder mixture from the supply hopper to the sprayer housing without the necessity for exhausting air to the outside environment, and hence, without the need for filtering of exhaust air. To this end, the powder transfer system 12 includes a first or supply conduit 35 connected between the powder supply hopper 30 and the sprayer housing 16, a second or return conduit 36 connected between the sprayer housing 16 and the powder supply hopper 30, and a blower 40 contained in one of the first or second conduits 35, 36, in this case in the return conduit 36, for generating an air flow and for directing air and powder in a substantially closed loop defined by the supply conduit 35, sprayer housing 16, return conduit 36, blower 40, and hopper 30. The supply conduit 35 has an outlet 41 connected to an end of the sprayer housing 16 adjacent the top thereof, and the return conduit 36 has an inlet 42 connected to the same end of the housing 16 as the supply conduit outlet 41 in laterally offset relation thereto. The conduits 35, 36 preferably are flexible tubular members of sufficient length to permit mounting of the supply hopper 30 at any convenient accessible location remote from the sprayer housing 16.

In keeping with the invention, the supply hopper has a mixing chamber associated therewith that receives a substantially constant volume of powder from the supply hopper and within which the powder is pneumatically agitated during operation of the powder supply system to create a relatively constant rich air-powder mixture for direction through the supply conduit to the sprayer housing. In the illustrated embodiment, the supply hopper 30 has a mixing chamber 44 associated with a lower end thereof. The supply hopper 30, as best depicted in FIGS. 4 and 5, has a lower trough defined by a first inclined wall 45 extending from one side wall 46 inwardly and downwardly to a bottom 48 of the hopper 30 and a second inclined wall 49 extending inwardly and downwardly from an opposite side wall 50 of the hopper to a point above the bottom 48 of the hopper for defining a discharge opening 51 having a relatively small height "h" on the order of about 1¼ inches. The inclined side wall 49 in this case terminates in a relatively small, depending, vertical flange 52.

The mixing chamber 44, as best shown in FIG. 5, is defined by a vertical wall 55 extending from the bottom 48 of the supply hopper 30 at a location outwardly of the discharge opening 51, a horizontal wall 56 extending outwardly away from an external side of the inclined wall 49 of the supply hopper trough at an elevation above the discharge opening 51, and an inclined wall 58 angled at about 45° to the vertical connecting the vertical and horizontal walls 55, 56. The illustrated mixing chamber 44 extend above the discharge opening 51 an elevation "e" of about twice the discharge opening height "h". The supply conduit 35 has an inlet 60 connected to and communicating with an upper portion of the mixing chamber 44 on one side thereof, and the return conduit 36 has an outlet 61 connected to and communicating with the mixing chamber 44 on an opposite side thereof. The return conduit outlet 61 preferably is in the form of a rigid tubular member secured within the inclined wall 58 of the mixing chamber 44 so as to be oriented at about 45° to the horizontal with one end extending into the mixing chamber 44 and an opposite end extending outwardly thereof over which the return conduit 36 is positioned. The supply conduit inlet 60 is a similar rigid tubular member mounted at a 45° angle to the vertical in the inclined wall 49 of the supply hopper trough and having one end extending into the chamber and the other end extending outwardly thereof over which the supply conduit 35 is mounted.

With particular reference to FIGS. 4 and 5, it can be seen that powder from the supply hopper 30 will feed through the discharge opening 51 into the mixing chamber 44 such that during operation of the system, a substantially constant volume of powder will be maintained in the mixing chamber 44. Operation of the blower 40 causes air to be directed through the return line 36 and forcefully discharge from the outlet 61 into the mixing chamber 44, causing powder within the mixing chamber to be agitated with considerable turbulence for creating a relatively rich and substantially constant air-powder mixture within the mixing chamber. At the same time, operation of the blower 40 creates a negative pressure within the supply conduit 35, causing the air-powder mixture to be drawn through the inlet 60 and supply conduit 35 and directed into the sprayer housing 16. While the return conduit outlet 61 and supply line inlet 60 each are mounted at 45° angles to the vertical, it will be appreciated that they may be mounted at different angles so long as they communicate with an upper portion of the mixing chamber 44.

In carrying out the invention, the blower 40 is a regenerative type blower that is adapted for low pressure operation with relatively high volume air-flow characteristics. The regenerative blower 40 may be of the type offered by E. G. & G. Rotron, Saugerties, N.Y., under the name Rotron Regenerative Blowers and by the Spencer Turbine Company under the name Vortex Blowers. As is known in the art, such regenerative type blowers generate pressure through centrifugal force, which acts on a limited area at the outer periphery of an enclosed ring. Air drawn into air inlet 65 of the blower 40 is accelerated by a vane type impeller 66 outwardly against the curved housing, where it is deflected back along the sides of the housing to the vein root area from which it started. As air re-enters the blade root area, it is again centrifuged outwardly. The cycle repeats during each revolution of the impeller, regenerating pressure with cycle. The air ultimately is diverted to an outlet 68 at pressures comparable to significantly larger centrifugal blowers.

The regenerative blower 40 has unexpectedly been found to more reliably and efficiently transfer air-powder mixtures in the powder supply system 12, as compared to centrifugal blowers, which in order to achieve comparable pressures are of relatively large size and inefficiently operate with much greater air flow characteristics, and as compared to conventional reciprocating type compressors with associated valving which tend to clog when directing rich powder and air mixtures and which create the possibility for contamination by the presence of lubricants. In a typical powder supply system, 12, a ⅓ horse power regenerative blower 40 has been utilized for generating a pressure differential across the inlet and outlet thereof of between about 26–32 inches/$H_2O$, while generating maximum air flow of 48 c.f.m. in ½ inch diameter supply and return conduits 36, 35. The air flow achieved by the regenerative blower 40 creates significant agitation within the mixing chamber 44, and hence maintains a relatively rich air-powder mixture therein so long as the powder supply in the hopper 30 exceeds a minimum level about the discharge opening 51. The operation of the blower 40 further has been found to enable both air and powder to be recirculated through the blower and supply conduit with sufficient force and turbulence for preventing clogging.

For uniformly distributing powder introduced into the spray housing 16 during operation of the powder supply system 12, the outlet 41 of the supply conduit 35 communicates with one end of the sprayer housing 16 and the inlet 42 of the return conduit 36 communicates with an opposite end of the sprayer housing. In the illustrated embodiment, as best illustrated in FIGS. 3 and 4, the outlet 41 of the supply conduit 35 has a tubular extension 70 that extends the length of the sprayer housing 16 and has an outlet 71 adjacent the end of the housing, and the inlet 42 of the return conduit 36 communicates with the end of the housing opposite that of the supply conduit extension outlet 71. The extension 70 of the supply conduit 35 preferably has its terminal end cut at and angle to the horizontal, such as on the order of 45°, so that the outlet 71 tends to direct air and powder upwardly into the sprayer housing. Since the powder discharging from the extension 70 supply conduit 35 enters at one end of the sprayer housing 16 and the return line 36 communicates with the opposite end, it has been found that powder tends to be distributed substantially over the length of the sprayer housing 16, and thus, tends to ensure more uniform discharge from the sprayer 11.

In practice, the powder supply system 12 preferably is operated on a continuous basis contemporaneously with operation of the printing line with which it is employed. A relatively rich air-powder mixture is drawn from the mixing chamber 44 of the powder supply 30 and forcefully directed through the supply conduit 35. Upon discharge from the supply conduit extension 70, the sprayer housing 16 serves as an expansion chamber which reduces the velocity of the air flow, allowing the powder particles to settle downwardly into the sprayer housing. Powder remaining airborne may be drawn into the return line 36 from the sprayer housing 16 and redirected to the supply hopper, via transfer through the blower 40, again without susceptibility for clogging. Moreover, since the blower 40 may be run on a continuous basis there is no need for timers or other selectively adjustable control means which must be set for particular printing operations. Because the powder supply system 12 operates through a closed loop without the discharge of air to the outside environment, nor is there a need for air filters.

Referring now to FIG. 7, there is shown an alternative embodiment of a powder supply system wherein similar items to those described have been given similar reference numerals with the distinguishing suffix "a". Similar to the previous embodiment, the powder supply system **12*a* includes a sprayer housing 16*a*, a powder supply hopper 30*a*, supply and return conduits 35*a*, 36*a*, and a regenerative blower 40*a* all connected in a closed loop system. The sprayer housing 16*a*, blower 40*a*, and supply and return conduits 35*a*, 36*a* may be identical to those previously described. The powder supply hopper 30*a*** in this case is a trough-like powder containing vessel having mechanical powder agitator and dispensing means therein.

For dispensing predetermined quantities of powder from the powder supply hopper **30*a* into the supply line 35*a*, a dispensing cylinder 75 is rotatably supported within a cylindrical lower end 76 of the supply hopper 30*a*. The cylinder 75 is formed with a plurality of circumferentially spaced powder receiving recesses 78** which, upon rotation, successively receive and carry a predetermined quantity of powder to a lower discharge spout 79 of the hopper which communicates with the supply conduit 35a. The dispensing cylinder 75 may be driven by an appropriate drive motor, or alternatively, coupled to the drive of the printing line with which the powder sprayer is used. For agitating the powder within the hopper 30a in order to break up clumps and ensure that the dispensing cylinder recesses 78 are filled with loose powder particles, an agitating blade 80 is supported within the hopper 30a at the neck of the trough thereof immediately above the dispensing cylinder 75 for power driven rotation. Again, the blower 40a is operable for forcefully directing an air stream through the supply conduit 36 with sufficient turbulence for creating a relatively rich air-powder mixture from powder dispensed from the cylinder 75 and for directing such mixture into the sprayer housing without susceptibility to clogging. As in the case of the previous embodiment, the sprayer housing 16 serves as an expansion chamber which allows the powder particles to settle downwardly into the sprayer housing, with powder that remains airborne being drawn into the return conduit for redirection through the blower 40 and supply conduit 35.

From the foregoing, it can be seen that the pneumatic powder supply system of the present invention is adapted for the reliable transfer of powder to powder sprayers in printing operations. The powder supply system eliminates the need for exhausting air to the outside environment, and hence, the need for filtering of exhaust air and the costs associated therewith. Nor is the system dependent upon selectively adjustable timers and the like for controlling the fill cycle. The powder supply system may be continuously operated, without susceptibility for clogging, or directing a relatively rich powder-air mixture from the supply hopper to the sprayer housing so long as powder is maintained above a predetermined minimum level in the supply hopper.

What is claimed is:

1. In a printing press having means for transferring sheet material along a predetermined path to a delivery station, a powder sprayer for directing anti-offset powder onto said passing sheet material for separating said sheet material upon stacking at the delivery station, said powder sprayer comprising
    a housing for containing a quantity of powder, said housing having an elongated discharge opening,
    a rotatable roller disposed within said opening for metering the discharge of powder from said housing through said discharge opening and onto said passing sheet material,
    a powder supply hopper remote from said housing for containing a supply of said powder,
    first and second conduits connecting said powder supply hopper to said housing, said conduits each having a diameter of about one-half inch,
    a selectively operable regenerative-type blower having an inlet and an outlet connected to one of said conduits and being operable for generating a pressure differential across said inlet and outlet of at least about 26 inches H$_2$O and an air flow in said conduits no greater than about 48 cfm,
    said first and second conduits, blower, housing, and supply hopper defining a closed loop through which air and powder may be circulated upon operation of said blower without filtering said air flow to the outside environment for transferring powder from said supply hopper to said housing for maintaining a quantity of powder in the housing for metering by said roller,
    said first conduit having one end connected to said supply hopper for directing an air flow generated by said blower forcefully against powder within said supply hopper for causing said powder to become air borne and for generating a relatively rich air powder mixture within said supply hopper, and
    said second conduit communicating with an upper portion of said supply hopper for receiving air borne powder in said mixing chamber for direction to said housing.

2. In the printing press of claim 1 in which said roller has an outer peripheral surface formed with relieved areas, and said housing includes doctor blades means in adjacent relation to the outer periphery of said roller for limiting the discharge of powder to that carried within the relieved areas of said roller.

3. A powder sprayer comprising
    a housing for containing a quantity of powder, said housing having an elongated discharge opening,
    a rotatable roller disposed within said opening for metering the discharge of powder from said housing through said discharge opening,
    a powder supply hopper remote from said housing,
    first and second conduits communicating between said powder supply hopper and housing,
    a selectively operable blower connected to one of said conduits,
    said first and second conduits, blower, housing and supply hopper defining a closed loop through which air and powder may be circulated upon operation of said blower for transferring powder from said supply hopper to said housing for maintaining a quantity of powder in the housing for metering by said roller,
    said supply hopper having a discharge opening, means defining a mixing chamber for receiving powder from said supply hopper discharge opening,
    said first conduit having one end connected to said mixing chamber for directing an air flow generated by said blower forcefully against powder within said mixing chamber for causing said powder to become air borne and for generating a relatively rich air powder mixture within said mixing chamber, and
    said second conduit communicating with an upper portion of said mixing chamber for receiving air borne powder in said mixing chamber for direction to said housing.

4. The sprayer of claim 3 in which said blower is a regenerative type blower.

5. The powder sprayer of claim 4 in which said blower is connected within said second conduit.

6. The powder sprayer of claim 3 in which said supply hopper has a trough shaped lower end formed with an inwardly and downwardly inclined wall terminating above a bottom of the hopper for defining said discharge opening, said mixing chamber defining means includes an enclosure mounted on an external side of said inclined hopper wall for receiving powder within said hopper through said discharge opening, and said enclosure having a height greater than the height of said discharge opening.

7. The powder sprayer of claim 3 in which a discharge end of said second conduit communicates with an upper portion of said mixing chamber on one side thereof and an inlet end of said first conduit communicates with an upper portion of said mixing chamber on an opposite side thereof.

8. The powder sprayer of claim 7 in which said second conduit discharge end directs air into said mixing chamber and against powder contained therein at an angle of about 45° to the vertical.

9. The powder sprayer of claim 8 in which said first conduit has an inlet extending into said mixing chamber at an angle of about 45° to the vertical.

10. In a printing press having means for transferring sheet material along a predetermined path, a powder sprayer for directing anti-offset powder onto said sheet material, said powder sprayer comprising
    a housing for containing a quantity of powder, said housing having an elongated discharge opening,
    a rotatable roller disposed within said opening for metering the discharge of powder from said housing through said discharge opening,
    a powder supply hopper remote from said housing,
    conduit means connecting said powder supply hopper to said housing,
    a selectively operable blower connected to said conduit means,
    said conduit means, blower, housing, and supply hopper defining a closed loop through which air and powder may be circulated upon operation of said blower for transferring powder from said supply hopper to said housing for maintaining a quantity of powder in the housing for metering by said roller,
    said supply hopper having a discharge opening, means defining a mixing chamber for receiving powder from said supply hopper discharge opening,
    said conduit means including a first conduit having one end connected to said mixing chamber for directing an air flow generated by said blower forcefully against powder within said mixing chamber for causing said powder to become air borne and for generating a relatively rich air powder mixture within said mixing chamber, and
    said conduit means including a second conduit communicating with an upper portion of said mixing chamber for receiving air borne powder in said mixing chamber for direction to said housing.

11. In the printing press of claim 10 in which said supply hopper has a trough shaped lower end formed with an inwardly and downwardly inclined wall terminating above a bottom of the hopper for defining said discharge opening, said mixing chamber defining means includes an enclosure mounted on an external side of said inclined hopper wall for receiving powder within said hopper through said discharge opening, and said enclosure having a height greater than the height of said discharge opening.

12. In the printing press of claim 11 in which said mixing chamber defining enclosure has a height of at least twice the height of said discharge opening.

* * * * *